United States Patent
Ede

[11] 3,898,940
[45] Aug. 12, 1975

[54] GROUND DRAINAGE SYSTEMS, AND METHOD AND APPARATUS THEREFOR

[76] Inventor: Ainsley Neville Ede, 36 Thornton Way, Cambridge, England

[22] Filed: Apr. 19, 1973

[21] Appl. No.: 352,704

[30] Foreign Application Priority Data
Apr. 20, 1972 United Kingdom............ 18258/72

[52] U.S. Cl. .................... 111/1; 111/76; 61/11
[51] Int. Cl. .............................................. A01c 5/00
[58] Field of Search ............... 111/1, 7, 6, 86, 76; 61/63, 11, 53.64, 10; 172/40

[56] References Cited
UNITED STATES PATENTS

| | | | |
|---|---|---|---|
| 3,411,467 | 11/1968 | van der Lely et al. | 111/86 X |
| 3,596,615 | 8/1971 | Fischer | 111/76 |
| 3,646,766 | 3/1972 | Hilton et al. | 61/63 X |
| 3,712,066 | 1/1973 | Hartzell | 61/63 X |
| 3,793,967 | 2/1974 | van den Berg | 111/7 |

*Primary Examiner*—Stephen C. Pellegrino

[57] ABSTRACT

A ground drainage system consists of a series of sand-filled water-permeable slit-like channels formed in the surface layer of the soil and extending downwardly widthwise from the ground surface, preferably into a water-permeable stratum beneath the top soil. The system is constructed by a movable machine carrying at least one downwardly-projecting vertical or inclined slitter blade having a hollow blade-like sand chute secured to its rear edge. The machine is advanced to draw the slitter blade or blades edgewise through the surface layer of the soil to form a soil channel or channels whilst sand is dispensed from an elongate slot in the trailing edge of the or each chute to fill the newly-formed soil slit or slits with sand. Vibration is applied to each slitter blade and simultaneously to its associated chute during the forward movement of the machine, to facilitate the soil slitting operation and the free passage of sand down the chute and through the dispensing slot into the soil slit.

30 Claims, 14 Drawing Figures

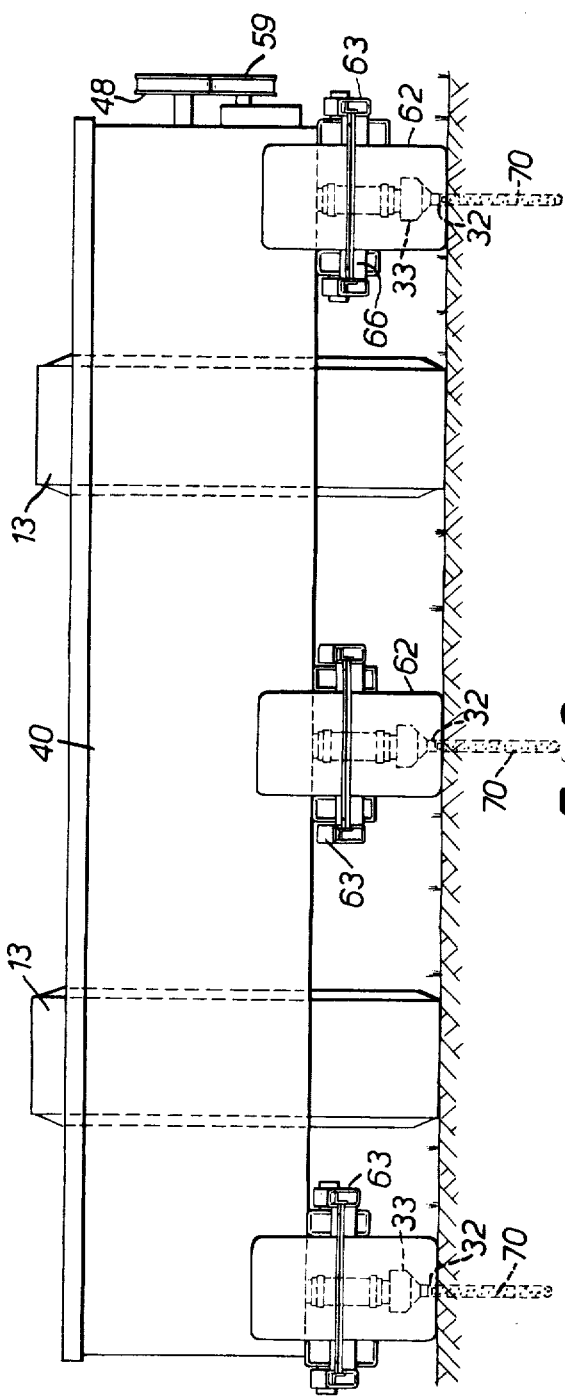
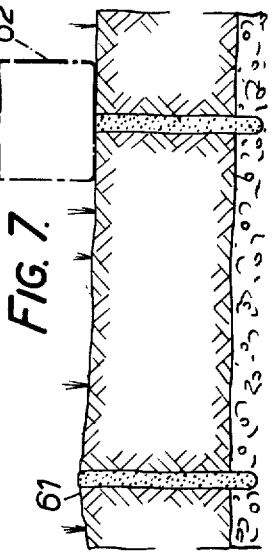
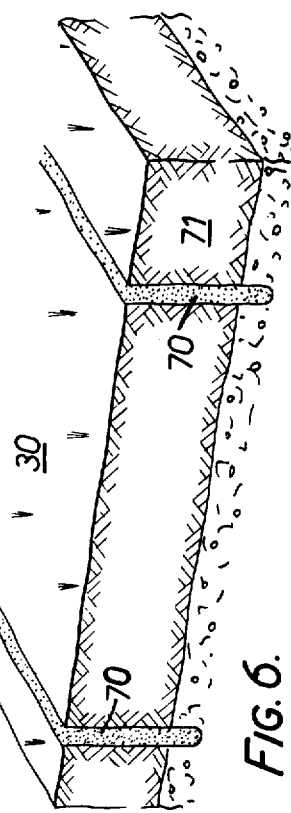

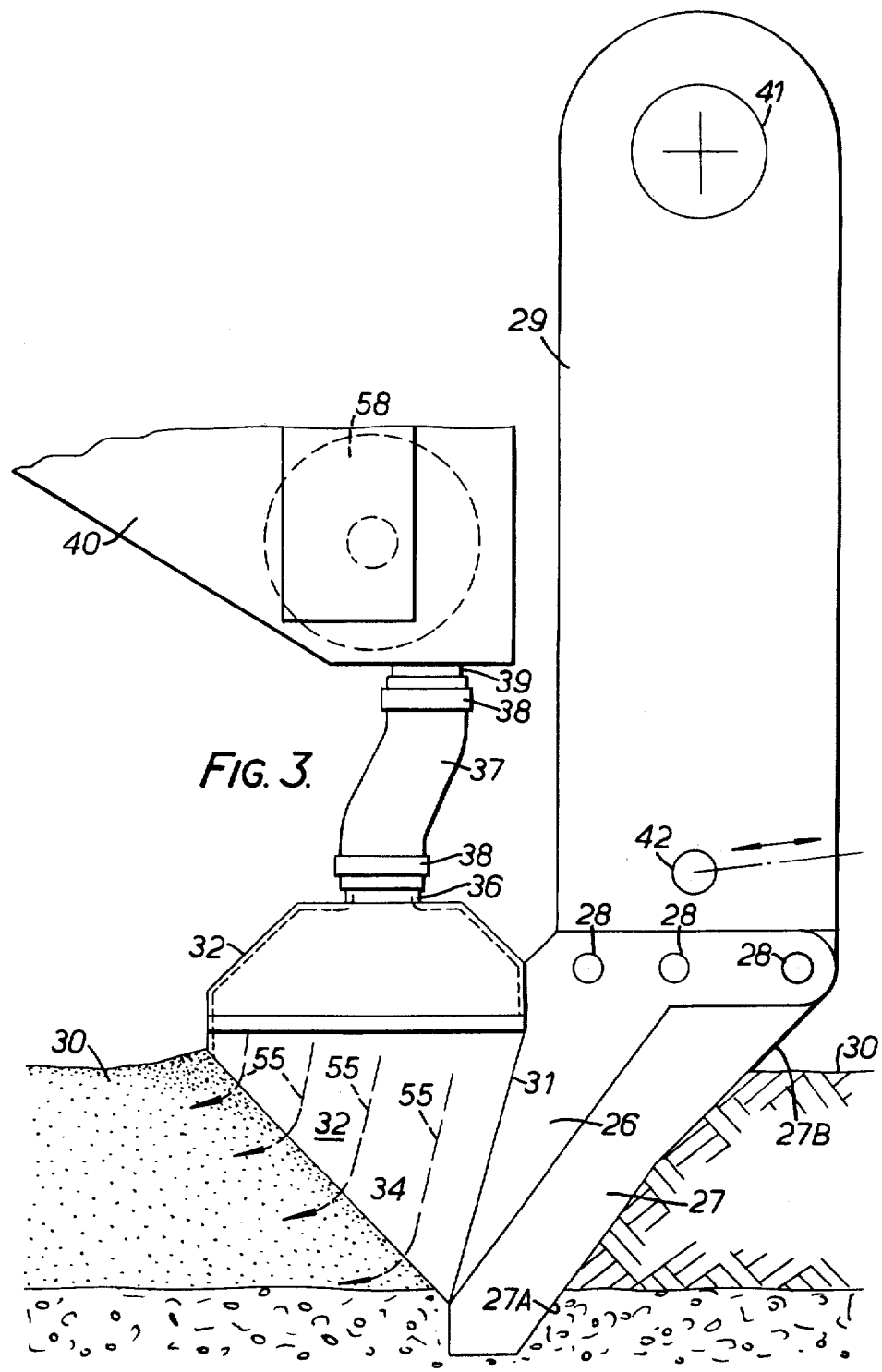

GROUND DRAINAGE SYSTEMS, AND METHOD AND APPARATUS THEREFOR

This invention relates to ground drainage systems, and to methods and apparatus for constructing such systems. The invention is particularly although not exclusively applicable to sports grounds, playing fields and like areas of ground having a level surface, usually turfed, requiring rapid drainage of surface water.

For drainage and other purposes in heavy soils and other media through which water cannot move freely, it is desirable to provide permeable channels to conduct surface water down to an underlying permeable stratum through which excess water can drain away. One object of the present invention is to provide a novel ground drainage system incorporating slit-like drainage channels filled with sand or other permeable medium for this purpose. Other objects of the invention are to provide a novel method and a novel apparatus for constructing such drainage systems.

According to one aspect of the present invention, a ground construction incorporates a surface drainage system comprising a system of slit-like channels formed in the soil and extending in a pattern over the area to be drained, each channel being deeper than it is wide with its upper edge at or near the ground surface, and each channel being filled with a permeable medium.

The permeable medium may consist of actual sand, or any other substance having the required permeability and other hydraulic properties, and being mechanically-stable and preferably non-toxic, for example grit, gravel, artificial granular material, or material formed from powders or liquids or by processing soil to provide a space-filling medium with the required water permeability and ability to resist soil pressure. All such natural and artificial permeable media will be referred to herein for convenience as "sand".

The sand-filled channels may be longitudinally-continuous or interrupted, and they may be parallel or near parallel to one another, or arranged in a network pattern of intersecting or non-intersecting channels. A typical arrangement would be parallel slits of 1 inch width and 12 inches depth spaced apart at intervals of 3 feet. The ranges of dimensions of immediate utility are, for width, one sixteenth inch to 4 inches; for depth 3 inches to 24 inches; and for spacing, 6 inches to 6 feet aart.

In most cases water will be able to pass into the sand-filled channels over and through the surface layers of soil, and to penetrate downwardly through the sand until it is able to permeate into an underlying permeable stratum, natural or artificial, which the channels approach or intersect at their lower edges. For instance this underlying permeable stratum may be a layer of gravel previously laid under the top soil, or a series of drains such as pipes overlaid by a permeable layer which the said channels intersect at their extremities. Such a system may be used "in reverse" for irrigation purposes by pumping water through the drainage pipes so that it escapes into the permeable layer and the sand-filled channels, and hence into the top soil.

The sand-filled channels may be parallel-sided, or they may be wider at the top than at the bottom, for example of downwardly-tapering or inwardly-stepped cross-section. The channels which are wider at the top will cater for conditions such as are met with in football pitches where surface mud is plentiful and might smear over the top of a narrow-mouthed slit and render it impermeable. The narrow lower parts of such sand-filled channels, perhaps 3 inches below the ground surface, will be sufficient to convey the drainage water downwardly.

In other cases, such as fairways or greens of golf courses, it may be desirable to locate the upper edges of the sand-filled channels just below the ground surface so as to avoid discontinuities in the turf.

The sand-filled channels may extend vertically downwardly, or they may be inclined to the vertical, for instance up to 45° or more. Inclined sand-filled channels have the advantage that they can sometimes be installed more easily, and that additional entry holes can be spiked downwardly through the overlying surface layer of soil into the inclined channels, for instance by a standard spiking machine acting from the surface of the ground. The invention according to another of its aspects comprises a method of constructing such a ground drainage system, by drawing through the ground a vertical or inclined slitter blade, or several spaced slitter blades, each having a hollow blade-like sand-dispensing chute secured to its trailing edge so as to follow the blade in the newly-formed soil slit, and dispensing sand from the chute into the newly formed slit to fill the latter through an elongated rearwardly-facing dispensing slot extending along the trailing edge of the chute over substantially the full depth of the soil slit, and vibrating both the slitter blade and the chute simultaneously and continuously throughout the forward traverse of the blade so as to facilitate the soil slitting process and the free dispensing of the sand. It is found that the application of vibration not only prevents the sand from clogging or bridging in the chute, keeping it flowing freely and vertically-downwardly in the chute, but it also has the effect of subjecting the sand to a form of quasihydrostatic pressure which assists the ejection of the sand through the dispensing slot into the soil slit and helps to ensure the complete filling of the latter.

Preferably the slitter blade and the chute are vibrated by a common vibrator which imposes vibration having major horizontal components of movement in the general plane of the blade.

The invention according to yet another aspect comprises an apparatus for making permeable channels in the ground, which can be used for constructing a novel drainage system as referred to be the method referred to. This apparatus comprises a slitter blade mounted on a carriage and extending downwardly from the carriage to below ground level for draining edgewise through the ground by the forward movement of the carriage so as to form a slit-like channel in the soil, whose depth is greater than its width, a hollow blade-like sand-dispensing chute whose width and depth below ground level are approximately the same as those of the slitter blade, the chute being secured to the slitter blade with its leading edge abutted against the trailing edge of the blade so that the chute follows the blade in the newly-formed soil channel, and the trailing edge of the chute affording an elongated rearwardly-facing dispensing aperture extending over substantially the full below-ground depth of the chute, means for introducing sand into the interior of the chute from above ground level, so as to fill the chute for dispensing through the whole length of the elongated slot into the soil channel, and means for imposing vibration simultaneously both to the slitter blade and to the chute throughtout the forward movement of the carriage, the said vibration facilitating the soil-slitting action of the blade and the free dispensing of sand from the slot in the chute to fill the channel.

The slitter blade may lie in a vertical plane, or it may be laterally-inclined so as to lie at an angle to the vertical, i.e. an asymmetrical blade arrangement as viewed from front or rear. If the blade is inclined, it will be formed along its leading edge with a cutting edge disposed in the plane of its underneath side face. In either case, the leading edge of the blade is preferably forwardly-inclined or rearwardly-inclined to the vertical. For example the leading edge may have a rearwardly-and-upwardly inclined lower portion, with a more shallowly inclined shorter upper portion which breaks through the soil surface.

The trailing edge of the sand chute, in which the dispensing slot is formed, is preferably rearwardly and upwardly inclined, thereby facilitating the discharge of the sand into the soil slit.

The carriage may be provided with ground wheels which are adjustable in height, for the purpose of adjusting the depth at which the slitter blade and chute will run through the ground. The carriage may be a trailer vehicle for towing behind a tractor, or it may be self-propelled or drawn by means by a winch and cable, to force the slitter blade through the ground. Two or more combinations of slitter blade and sand chute may be mounted side-by-side in positions spaced apart on the carriage, for simultaneously slitting several soil channels and filling them with sand. A common sand bin may be mounted on the carriage above the chutes for supplying all the chutes with sand.

Any convenient form of vibrator means may be provided for imparting the required vibration to the or each slitter blade and sand chute, preferably a vibration with a major component of displacement in a horizontal direction parallel to the plane of the blade. For example the or each blade may be supported by a plate which is pivotally or resiliently mounted near its upper end, and may be vibrated by means of a rotary eccentric driving the blade or its supporting plate either directly or through a connecting rod mechanism, the small end of the connecting rod being coupled to the plate or blade at a point spaced from the pivotal or resilient mounting. The major component of displacement of the vibration may be inclined slightly upwardly or slightly downwardly to the horizontal, depending on the geometry of the arrangement.

However any other kind of vibrator, such as a hydraulic ram driven in reciprocation by a hydraulic control system, or a rotary vibrator of inertia type, or an electrommagnetic vibrator, may be employed, giving symmetrical or asymmetrical vibration cycles, in any direction permitted by the blade support mounting means. Another example is a vibrator of semi-percussive type, inducing a movement in the forward direction with greater acceleration than the return movement in the reverse direction.

Where multiple blade systems are mounted on a common carriage, the timing of the vibrations of the various blade systems may either be in phase or not, e.g. with the forward thrusts in concert or in succession.

The slitter blade will usually tend to displace a small quantity of soil laterally and upwardly to a position slightly above the surrounding ground level, resulting in a slight lifting of the ground along each soil slit behind the machine. This can be overcome by fitting a roller to the carriage to run behind each blade and chute assembly so as to roll flat the top of the newly-formed sand-filled soil slit.

In the case of a machine having several (for instance three) blade and chute assemblies mounted on a common carriage, the equipment will be too heavy to be operated as a hand-steered vehicle, and it must be coupled to the rear linkage of a suitable tractor, or else constructed as a self-propelled vehicle with power-steering arrangements. Considerable weight is needed for making the blades slit the soil successfully, and this weight can be provided partly by the machine itself and partly by the supply of sand carried by the hoppers and bins on the machine. Moreover where the machine is towed by a tractor having a conventional hydraulic rear linkage, it is possible to arrange the towing mechanism so that the tractor linkage exerts a downward force on the towed carriage, so that a part of the weight of the tractor is transferred to the trailer vehicle.

The invention can be carried into practice in various ways, but one specific embodiment and various modifications thereof will now be described by way of example only, and with reference to the accompanying drawings, in which:-

FIG. 2 is an elevational view of the rear end of the machine of FIG. 1;

FIG. 3 is a detail view in side elevation of one of the three blade/chute assemblies of the machine of FIGS. 1 and 2, showing the blade mounting arrangements;

FIG. 6 is a perspective diagram illustrating the soil drainage system which is constructed by the machine of FIGS. 1 and 2;

FIG. 7 is a sectional view of an unrolled sand filled slit as formed by the machine, and also of a rolled slit;

Figure 1:
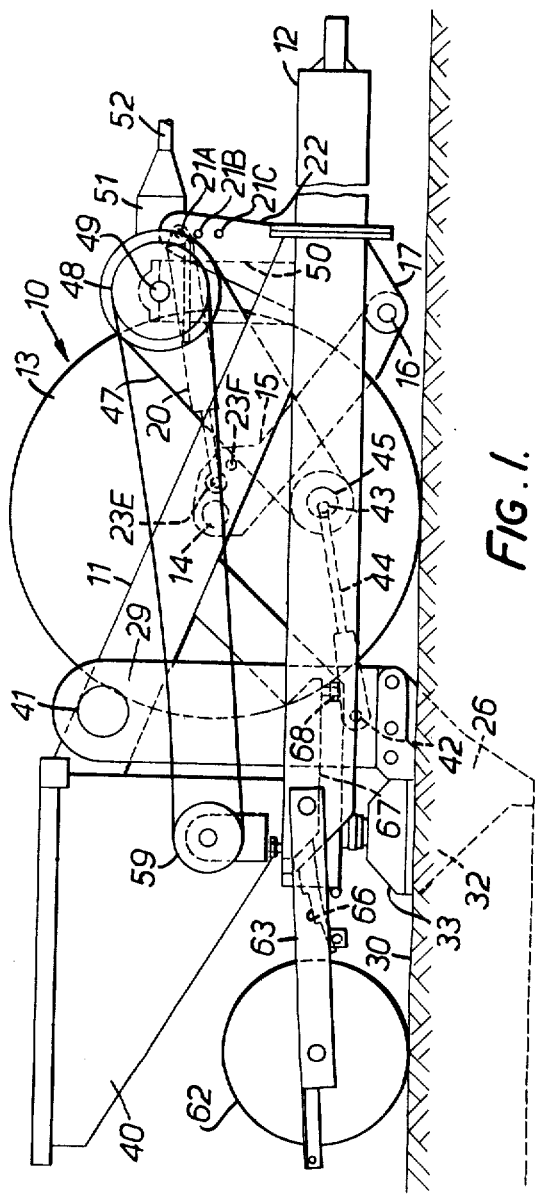
FIG. 1 is a side elevation of a trailer machine for forming sand-filled channels in the ground.
Figure 5:
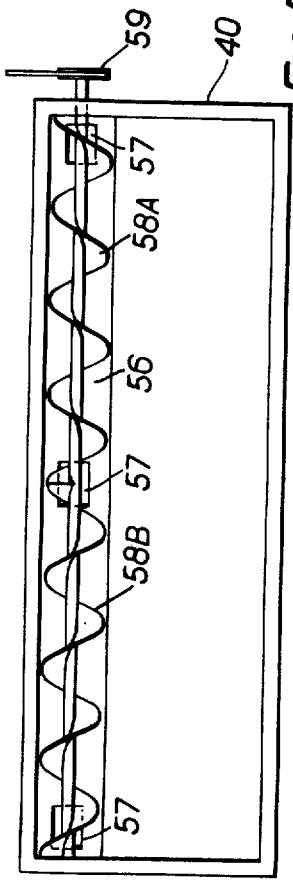
FIG. 5 is a plan view of the main sand bin on the machine of FIGS. 1 and 2, showing the auger feed mechanism.
Figure 11:
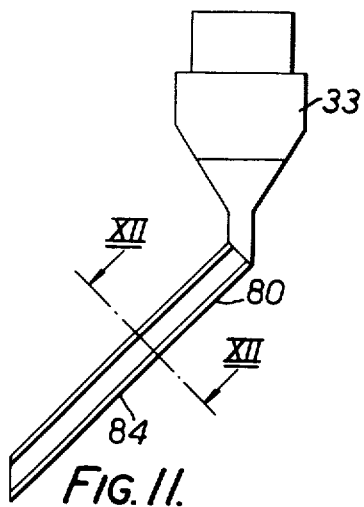
FIG. 11 is a rear elevation of a modified form of blade/chute assembly which can be used in the machine of FIGS. 1 and 2, the blade being laterally inclined.
Figure 14:
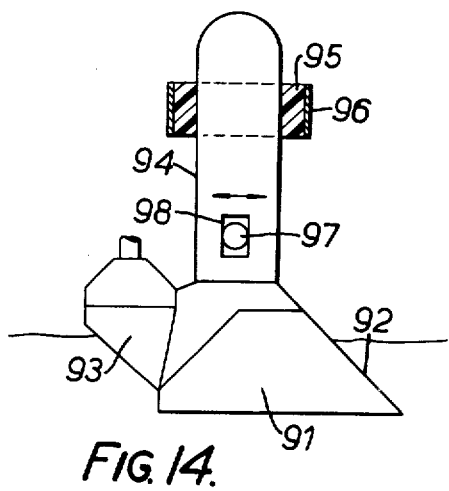
Figure 13:
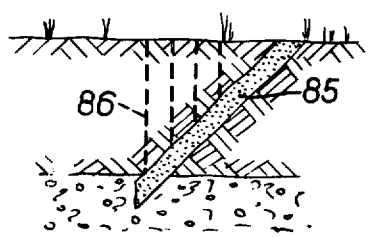

FIG. 13 is a cross-sectional diagram of the form of sand-filled slit formed by the inclined blade/ chute construction of FIG. 11; and FIG. 14 is a diagram similar to FIG. 3 of an alternative form of blade/chute assembly with a modified blade profile and a modified mounting and vibrating arrangement. In the embodiment illustrated in FIGS. 1 to 5, a machine 10 for constructing a ground drainage system comprises a trailer vehicle having a chassis frame 11 with a forwardly-extending rigidly-mounted towbar 12 which can be coupled to a tractor for towing the machine. The machine 10 is supported upon two large-diameter ground wheels 13 of adjustable height, each journalled at 14 on the outer end of a radius arm 15 whose inner end is pivoted at 16 to a fixed bracket 17 on the lower part of the chassis frame 11. A hydraulic ram 20 is provided for adjusting the running height of each wheel 13 and holding it at the required height. Each ram cylinder can be pivotally mounted by means of a pin to any one of three anchorage holes 21A, 21B and 21C in an upright bracket 22 rigidly secured to the frame 11, and the ram plunger can be pivotally secured by means of a pin to either of two alternative anchorage holes 23E, 23F formed in the radius arm 15, giving five different preset minimum extensions of each ram and hence five different preset fully-raised positions of the ground wheels 13 corresponding to five possible working heights of the machine 10. When the rams 20 are fully extended, the radius arms are swung anti-clockwise in FIG. 1, raising the chassis 11 and blade system of the machine 10 well clear of the ground for blade extraction and for transport. The rams are actuated by hydraulic hoses (not shown) connected to the hydraulic system of the towing tractor.

Figure 4:
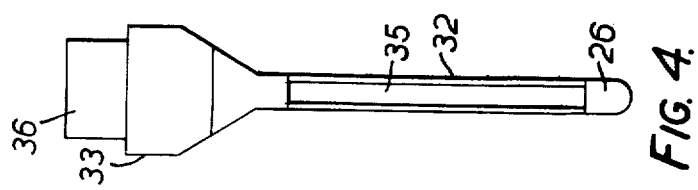
FIG. 4 is a rear elevation of the sand chute of FIG. 3.

The blade/chute assemblies of the machine 10 will now be described with particular reference to FIGS. 3 and 4. There are three of these, mounted side-by-side in spaced positions on the frame 11 as shown at 25A, 25B and 25C in FIG. 2. FIGS. 3 and 4 show one of the assemblies 25A, and the other two are similar and similarly-mounted. Each assembly comprises a slitter blade 26 with a replaceable leading edge portion 27, the blade 26 being bolted by three bolts 28 to the lower end of an upwardly-extending supporting plate or beam 29. The leading edge of the blade 26 has a forwardly-and-upwardly inclined rake including a steeply-inclined lower portion 27A and a slightly less steeply-inclined upper portion 27B which in use breaks through the ground surface 30. Attached rigidly to the trailing edge 31 of the slitter blade 26 is the leading edge of a hollow blade-like sand chute 32 whose overall thickness equals that of the blade 26 and whose depth is slightly less than that of the blade 26. The chute 32 has parallel side walls and an open top to which a hopper 33 is secured. The trailing edge 34 of the chute 32 is rearwardly and upwardly inclined at about 45°, and is formed with an elongated rearwardly-facing dispensing slot 35 (FIGS. 2 and 4), extending from above ground level 30 at the top of the chute down to the lowest part of the chute. The hopper 33 is provided with a spigot tube 36 projecting upwardly from its top, the tube 36 being connected by a resilient sleeve 37 and tension straps 38 to one of three downwardly-projecting discharge tubes 39 of a large sand bin 40 mounted on the rear of the chassis frame 11 to supply the chutes of all three blade assemblies 25A, 25B, 25C with sand.

The supporting beam 29 of each blade/chute assembly is pivoted at 41 near its upper end to the upper part of the chassis frame 11 so that the entire blade/chute assembly and beam can rock to-and-fro about the bearing 41. A vibrator mechanism is coupled to a second bearing 42 near the lower end of the beam 29. The vibrator mechanism comprises an eccentric 43 on a crankshaft journalled in the lower part of the chassis frame 11 and a connecting rod 44 whose "big end" 45 is journalled on the eccentric 43A and whose "small end" 46 is journalled in the bearing 42 near the lower end of the beam 29. Each crankshaft with its eccentric 43 is driven via a belt drive 47 from on of three pulleys 48 mounted on a transverse drive shaft 49 journalled in brackets 50 on the chassis frame 11, the drive shaft 49 being driven via a reduction gear box 51 from a telescopic transmission shaft 52 coupled to the power-take-off of the towing tractor. The vibrator mechanism described thus causes a cyclic vibration of each support beam 29 and blade/chute assembly 25A, 25B or 25C with horizontal (circumferential) displacements about the axis of the upper bearing 41 of the beam 29. This vibration assists the flow of sand from the hopper 33 down the duct in the interior of each chute 32 and through the discharge slot 35 into the newly-formed soil slit, ensuring that the sand does not bridge over the narrow entrance to the upper part of the duct or in the duct. The vibration causes the sand to flow down the duct in the chute 32 along more or less vertical paths, as indicated at 55 in FIG. 3, building up a deposit of sand progressively in the soil slit, starting at the bottom of the slit below the base of the discharge slot 35 and finishing at the top of the soil slit under the upper end of the discharge slot 35. The vibratory action overcomes the skin friction between the sand and the chute walls, and in particular any vertical component of the vibration (such as will be produced if the beam 29 is not quite vertical) helps to carry the sand downwards. The vibration induces a net flow of sand downwardly and also enables the sand to emerge through the dispensing slot 35 of the chute under a form of pressure similar to a hydrostatic head which is helpful in filling the soil slot adequately. Due to sand and soil settlement and the short space of time available for the final placement of the highest portion of sand in the soil slit, it is desirable to have a small surplus of sand deposited initially above the ground level 30. This can be achieved by ensuring that the upper end of the dispensing slot 35 protrudes slightly above the ground level 30.

The hoppers 33 are small, to ensure that the mass of sand which they carry will be insufficient to damp the vibration applied to the blade/chute assemblies. The hoppers 33 are maintained full by the large sand bin 40 which is of downwardly-tapering section as shown in side elevation if FIG. 1. The narrow bottom wall 56 of the bin 40 is formed with three outlet 57 leading to its three discharge tubes 39, and an auger screw 58 is journalled in the lowest part of the bin 40 immediately above the outlets 57. The auger screw 58 has oppositely-handed right and left screw parts 58A, 58B seen in FIG. 5, and is rotated through gearing not shown from a pulley 59 on the outside of the bin 40, the pulley 59 being driven by a belt 60 from the main drive shaft 49. The auger screw 58 ensures that the sand does not compact in the bin 40 and choke the outlets and also distributes the sand outwardly towards the two outermost outlets 57. The auger maintains the circulation of sand in the bin 40, preventing consolidation and bridging, and ensures a continuous metered feed to the three outlets 57 and hence to the three hoppers 33 of the blade chutes 32.

The slitting blades 26 may cause a partial soil displacement laterally and upwardly, forming a small surface ridge at the top of each sand-filled soil slot behind the machine, as shown at 61 in the left-hand part of FIG. 7. To remove the ridges 61, three rollers 62 are drawn behind the machine 10 immediately behind the three chutes 32, and run along the tops of the respective slits and the marginally-adjacent soil, pressing down the ridges 61 by their rolling action. Each roller 62 is journalled in a rectangular frame 63 trailed behind the chassis 11 to which it is pivoted at 64. A stop 65 on the frame 11 limits the downward pivotal movement of each frame 63. Moreover each frame 63 and its roller 62 are spring-biased downwardly by means of a cantilever leaf spring assembly 66 mounted in a square-section box 67 secured to the chassis-frame 11. Screw adjusters 68 are provided for setting the springs 66, whose resilient downward pressure on the rollers 62 ensure their smooth rolling pressure on the soil without interference from vibrations of the main machine.

In operation, the machine 10 is towed by the tractor with the ground wheels 13 in their raised position so that the blades 26 and chutes 32 are drawn through the ground, forming the three soil slits and filling them with sand, and finally rolling the tops of the slits. FIG. 6 shows diagrammatically the construction of the drainage system thereby formed, two only of the three sand-filled slits 70 being shown. It will be seen that each sand-filled slit extends vertically down from the ground surface 30 through the layers of top soil 71 until the slit intersects a permeable layer 72 of gravel or like water-permeable material in the subsoil. This layer 72 if not present naturally may be laid artificially as a part of the construction of the field, e.g. a playing field, and may incorporate a system of drain pipes (not shown). The three slits 70 formed in each pass of the machine extend continuously across the entire width of the field to be drained, and several traverses of the machine are made across the field to cover the whole area of the field with a pattern of parallel or intersecting sand-filled slits 70. At the end of each traverse the ground wheel rams 20 are extended to raise the chassis frame 11 and hence retract the blades 26 and chutes 32 clear of the ground.

Figure 8:
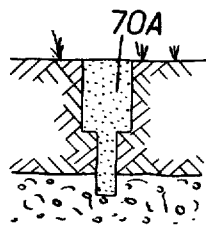
FIGS. 8, 9 and 10 show three modified cross- sections of sand-filled slit which can be constructed by the machine of FIGS. 1 and 2 using modified slitter blades.
Figure 9:
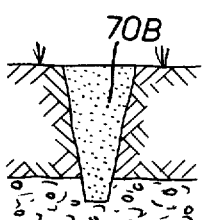

FIGS. 8, and 9 show two different cross-sections of sand-filled slit which can be constructed instead of the slits 70, by provision of slitter blades of correspondingly-modified cross-section instead of the blades 26. The slit 70A of FIG. 8 is of stepped cross-section, and the slit 70B of FIG. 9 is of downwardly-tapering cross-section. The wider upper part of each of these slits 70A and 70B is of value in preventing the slit being closed by a smearing of mud, e.g. in the case of a football pitch.

The wider upper part of the stepped slit 70A of FIG. 8 may be preformed by means of an additional slitter blade (not shown) having a chisel shape, with a cutting edge at its horizontal lower face and an upper face which is upwardly and rearwardly inclined at a shallow angle from the cutting edge. One such additional blade may be mounted on the machine directly in front of each narrower main blade 26 so that it grooves out the wide uppper part of the slit 70A as the machine advances. The auxiliary blade may be provided with a pair of spaced slitting discs mounted in staggered relationship ahead of its cutting edge make spaced parallel vertical cuts in the soil which will form the side walls of the groove to be formed by the auxiliary blade.

Figure 10:
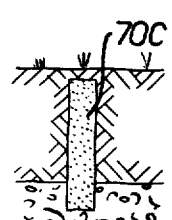

FIG. 10 shows a parallel-sided slit 70C similar to the slits 70 of FIG. 6 but with its upper edge just below the ground surface. These slits 70C are formed by the machine 10 using the blades 26 as described, and after their formation a thin layer of top soil or turf is laid on top of the ground to cover the slits. As mentioned, this arrangement is of value in the case of golf greens and fairways, or bowling greens, to avoid any surface discontinuity.

Figure 12:
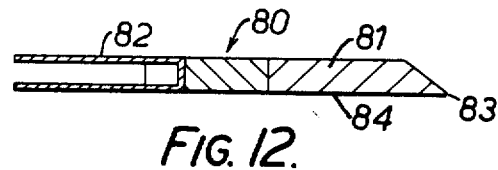
FIG. 12 is a fragmentary cross-section on the line XII—XII of FIG. 11.

FIGS. 11 and 12 show a modified construction of blade/chute assembly 80 which can be used with the machine 10 instead of the assemblies 25A, etc. In the assemblies 80 the blade 81 and chute 82 have the same profile as in FIG. 3 but are inclined laterally to the vertical (as seen from front or rear) at about 45°, or another required inclination. As seen in FIG. 12 the leading edge of the blade 81, instead of being of V-shape in cross-section as in FIG. 3, is of chisel-section having a cutting edge 83 formed at the lower face 84 of the blade 81, i.e. the face which is downwardly-directed. This arrangement ensures that the soil is displaced upwardly by the blade 81 as it is drawn through the ground, so that the blade does not impose a downward thrust on the compacted subsoil beneath it. FIG. 13 shows the cross-section of the sand-filled slit 85 formed by the machine 10 when fitted with laterally-inclined blade/chute assemblies 80. It will be seen that holes 86 can be spiked through from the ground surface to meet the upper face of the sand-filled slit 85, using an ordinary spiking machine, these holes 86 providing additional drainage passages for surface water leading into the permeably channel 85.

FIG. 14 shows a modified construction of blade/chute assembly 90 which can be employed in the machine 10 instead of the assemblies 25A, etc. In this case the blade 91 of the assembly 90 has a straight leading edge 92 which is inclined forwardly and downwardly at an angle of 45° or thereabouts to the vertical. The construction of the chute 93 is similar to that of the chute 32. In this case, moreover, the blade supporting beam 94 instead of being journalled in an upper bearing 41 is supported resiliently by means of an elastomeric mounting ring 95 bonded to the beam 94 and also to a surrounding frame 96 rigidly secured to the chassis 11. The resilience of the mounting ring 95 allows the necessary vibratory movements to be imposed on the beam 94 by the vibrator mechanism, which in this case comprises a rotary eccentric 97 directly engaged in a slot 98 formed in the lower part of the beam 94.

What I claim as my invention and desire to secure by Letters Patent is:

1. Apparatus for making water-permeable channels in the ground, which comprises a slitter blade mounted on a carriage and extending downwardly from the carriage to below ground level for drawing edgewise through the ground by the forward movement of the carriage so as to form a slit-like channel in the soil, a hollow blade-like sand-dispensing chute whose width and depth below ground level are approximately the same as those of the slitter blade, the chute being secured to the slitter blade with its leading edge abutted against the trailing edge of the slitter blade so that the chute follows the blade in the newly-formed soil channel, and there being an elongated rearwardly-facing dispensing aperture formed in and extending substantially over the full below-ground depth of the chute, means secured to the carriage for movement therewith for introducing sand into the interior of the chute from above ground level so as to fill the chute for dispensing sand through the whole length of the elongated dispensing slot into the soil channel, and means mechanically coupled to the slitter blade for imposing vibration simultaneously both on the slitter blade and on the chute throughout the forward movement of the carriage.

2. Apparatus as in claim 1 in which the leading edge of the slitter blade is forwardly and downwardly inclined and terminates in a pointed leading edge.

3. Apparatus as in claim 1 in which the trailing edge of the chute, in which the dispensing aperture is formed, is rearwardly and upwardly inclined.

4. Apparatus as in claim 1 in which the carriage is supported on ground-engaging wheels, each said wheel being journalled on one end of a radius arm whose other end is pivotally secured to the carriage, and power-operated ram means being connected between the carriage and a point of each said radius arm spaced from its said other end, said ram means being operable to move said radius arm pivotally about its said other end and thereby to adjust the height of the associated wheel relatively to the carriage, thereby enabling the depth at which the slitter blade will run to be adjusted, the adjustment of the ground wheels to their lowest position relative to the carriage withdrawing the slitter blade clear of the ground.

5. Apparatus as in claim 1 including a plurality of combinations of slitter blade and chute are mounted side by side on the carriage, for the simultaneous formation of a corresponding number of parallel sand-filled ground channels.

6. Apparatus as in claim 1 wherein said sand introducing means includes a hopper mounted on the upper end of said chute.

7. Apparatus as in claim 1 wherein said slitter blade is rigidly secured to the lower end of a support member whose upper end is movably supported in the carriage, and in which the means for imposing vibration acts on the support member at a point spaced from its upper end.

8. Apparatus as in claim 1 wherein said vibration imposing means produces a cyclic vibratory movement of the blade and chute having a major horizontal component in the general plane of the blade.

9. Apparatus as in claim 1 including, a trailed roller secured to the carriage in a position behind the carriage in which it rolls the slitted ground surface behind the trailing edge of the chute.

10. Apparatus as claimed in claim 1 in which the slitter blade is parallel-sided.

11. Apparatus as in claim 10 in which the slitter blade is inclined to the vertical as viewed from front or rear.

12. Apparatus as claimed in claim 10 in which the slitter blade extends vertically downwardly, as viewed from front or rear.

13. Apparatus as claimed in claim 12 in which the slitter blade is inclined to the vertical as viewed from front or rear.

14. Apparatus as claimed in claim 13 in which the cross-section of the leading edge of the slitter blade is of bevel form having a cutting edge lying in the plane of the downwardly-facing side face of the blade.

15. Apparatus as claimed in claim 13 in which the leading edge of the slitter blade is forwardly and downwardly inclined and terminates in a pointed leading end.

16. Apparatus as claimed in claim 15 in which the leading edge of the slitter blade is rearwardly and downwardly inclined.

17. Apparatus as claimed in claim 16 in which the lower part of the leading edge of the blade is more steeply inclined than the upper part which breaks through the soil surface.

18. Apparatus as claimed in claim 17 in which the trailing edge of the chute, in which the dispensing aperture is formed, is rearwardly and upwardly inclined.

19. Apparatus as claimed in claim 18 in which the carriage is supported on ground-engaging wheels, each said wheel being journalled on one end of a radius arm whose other end is pivotally secured to the carriage, and power-operated ram means being connected between the carriage and a point of each said radius arm spaced from its said other end, said ram being operable to move said radius arm pivotally about its said other end and thereby to adjust the height of the associated wheel relatively to the carriage, thereby enabling the depth at which the slitter blade will run to be adjusted, the adjustment of the ground wheels to their lowest position relative to the carriage withdrawing the slitter blade clear of the ground.

20. Apparatus as claimed in claim 19 in which the carriage is a trailer vehicle for towing behind a tractor, the carriage having rigidly secured to it a forwardly-extending towbar and having a single pair of coaxial ground wheels.

21. Apparatus as claimed in claim 20 in which two or more combinations of slitter blade and chute are mounted side by side on the carriage, for the simultaneous formation of a corresponding number of parallel sand-filled ground channels.

22. Apparatus as claimed in claim 21 in which each of the chutes has a hopper mounted on its upper end above ground level for feeding sand into the interior of the chute.

23. Apparatus as claimed in claim 22 in which a sand-containing bin is mounted on the carriage above the or each hopper, the capacity of the bin being much larger than that of the or each hopper, and in which the bin is provided with means for discharging sand at a controlled rate into each hopper.

24. Apparatus as claimed in claim 23 in which the bin is of downwardly-tapering cross-section in planes parallel to the direction of forward movement of the carriage, and in which the means for discharging sand from the bin comprises an auger screw mounted in bearings in the lowest part of the bin and extending transversely therein above a discharge aperture connected to the or each chute hopper, and means for rotating the auger screw.

25. Apparatus as claimed in claim 24 in which each slitter blade is rigidly secured to the lower end of a support member whose upper end is movably supported in the carriage, and in which the means for imposing vibration acts on the support member at a point spaced from its upper end.

26. Apparatus as claimed in claim 25 in which the means for imposing vibration comprises a power-driven rotary eccentric acting on the support member for the blade.

27. Apparatus as claimed in claim 25 in which the means for imposing vibration produces a cyclic vibratory movement of the blade and chute having a major horizontal component in the general plane of the blade.

28. Apparatus as claimed in claim 27 in which the vibratory movement also has a vertically-downward component of movement.

29. Apparatus as claimed in claim 28 including, for each blade/chute combination, a trailed roller secured the carriage in a position behind the carriage in which it rolls the slitted ground surface behind the trailing edge of the chute.

30. Apparatus as claimed in claim 29 including, for each blade/chute combination, a tow bar pivotally secured at one end to the carriage, the trailed roller being journalled in the other end of the tow bar for towing thereby, and including spring means acting between the carriage and tow bar to spring-press the or each trailed roller downwardly.

* * * * *

UNITED STATES PATENT OFFICE
CERTIFICATE OF CORRECTION

PATENT NO. : 3,898,940
DATED : August 12, 1975
INVENTOR(S) : Ainsley Neville Ede It is certified that error appears in the above-identified patent and that said Letters Patent are hereby corrected as shown below:

Item [30] Foreign Application Priority Data, besides the stated priority data, there should be read thereunder:

September 1, 1972   United Kingdom ...40627/72

Signed and Sealed this sixteenth Day of December 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,898,940      Dated August 12, 1975

Inventor(s) Ainsley Neville Ede

It is certified that error appears in the above-identified patent and that said Letters Patent are hereby corrected as shown below:

-- [73] Assignee: Cambridge Soil Services Limited, Cambridge, England --.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*